United States Patent [19]

Maus et al.

[11] Patent Number: 5,464,679
[45] Date of Patent: Nov. 7, 1995

[54] METAL HONEYCOMB BODY OF INTERTWINED SHEET-METAL LAYERS, AND METHOD FOR ITS PRODUCTION

[75] Inventors: Wolfgang Maus; Helmut Swars; Rolf Brück, all of Bergish Gladbach; Bohumil Humpolik, Ludwigsburg, all of Germany

[73] Assignee: Emitec Gesellschaft fuer Emissionstechnologie mbH, Lohmar, Germany

[21] Appl. No.: 91,613

[22] Filed: Jul. 14, 1993

[30] Foreign Application Priority Data

Jul. 14, 1992 [DE] Germany .......................... 42 23 096.9
Jul. 14, 1992 [DE] Germany .......................... 42 23 134.5

[51] Int. Cl.$^6$ ........................................ B32B 3/12
[52] U.S. Cl. ..................... 428/116; 428/188; 502/527
[58] Field of Search ..................... 428/116, 188, 428/593; 502/439, 527

[56] References Cited

U.S. PATENT DOCUMENTS

| | | | |
|---|---|---|---|
| 3,890,104 | 6/1975 | Porta et al. ........................... | 428/592 X |
| 4,273,681 | 6/1981 | Nonnenmann ........................ | 502/527 X |
| 4,598,063 | 7/1986 | Retallick ............................... | 428/116 X |
| 4,647,435 | 3/1987 | Nonnenmann ........................ | 502/527 X |
| 4,713,361 | 12/1987 | Maus ..................................... | 428/116 X |
| 4,719,680 | 1/1988 | Cyron .................................... | 428/116 X |
| 4,818,746 | 4/1989 | Cyron .................................... | 502/439 X |
| 4,832,998 | 5/1989 | Cyron .................................... | 428/116 |
| 4,923,109 | 5/1990 | Cyron .................................... | 428/116 X |
| 5,094,074 | 3/1992 | Nishizawa et al. .................. | 428/116 X |
| 5,102,743 | 4/1992 | Maus et al. .......................... | 428/116 X |
| 5,105,539 | 4/1992 | Maus et al. .......................... | 502/527 X |
| 5,135,794 | 8/1992 | Maus et al. .............................. | 428/116 |
| 5,139,844 | 8/1992 | Maus et al. .............................. | 428/116 |
| 5,328,774 | 7/1994 | Maus et al. .............................. | 428/593 |
| 5,370,943 | 12/1994 | Bruck et al. ............................ | 428/593 |
| 5,372,893 | 12/1994 | Osui ....................................... | 428/593 |

FOREIGN PATENT DOCUMENTS

| | | |
|---|---|---|
| 0222355 | 5/1987 | European Pat. Off. . |
| 9003220 | 4/1990 | WIPO . |

*Primary Examiner*—Henry F. Epstein
*Attorney, Agent, or Firm*—Herbert L. Lerner; Laurence A. Greenberg

[57] ABSTRACT

A metal honeycomb body is disposed within a jacket member. At least partly structured sheet-metal layers are wrapped around one another and extend alternatingly back and forth in a curved, preferably involute, fashion between an outer annular region and an inner annular region of the honeycomb body. The sheet-metal layers form loops. At least three reversal lines are defined in the outer annular region, and the sheet-metal layers are intertwined about these reversal lines. A method for producing the honeycomb body includes the following steps: forming or winding a multi-layer hollow coil from at least one sheet-metal strip which has at least partial structuring; deforming the multi-layer hollow coil from the outside thereof towards the inside at at least three lines such that the at least one sheet-metal strip extends in loops between outer and inner reversal lines; and compacting the resulting deformed multi-layer structure about the inner reversal lines by rotationally intertwining the loops formed by the folded sheet-metal layers in a given direction.

23 Claims, 12 Drawing Sheets

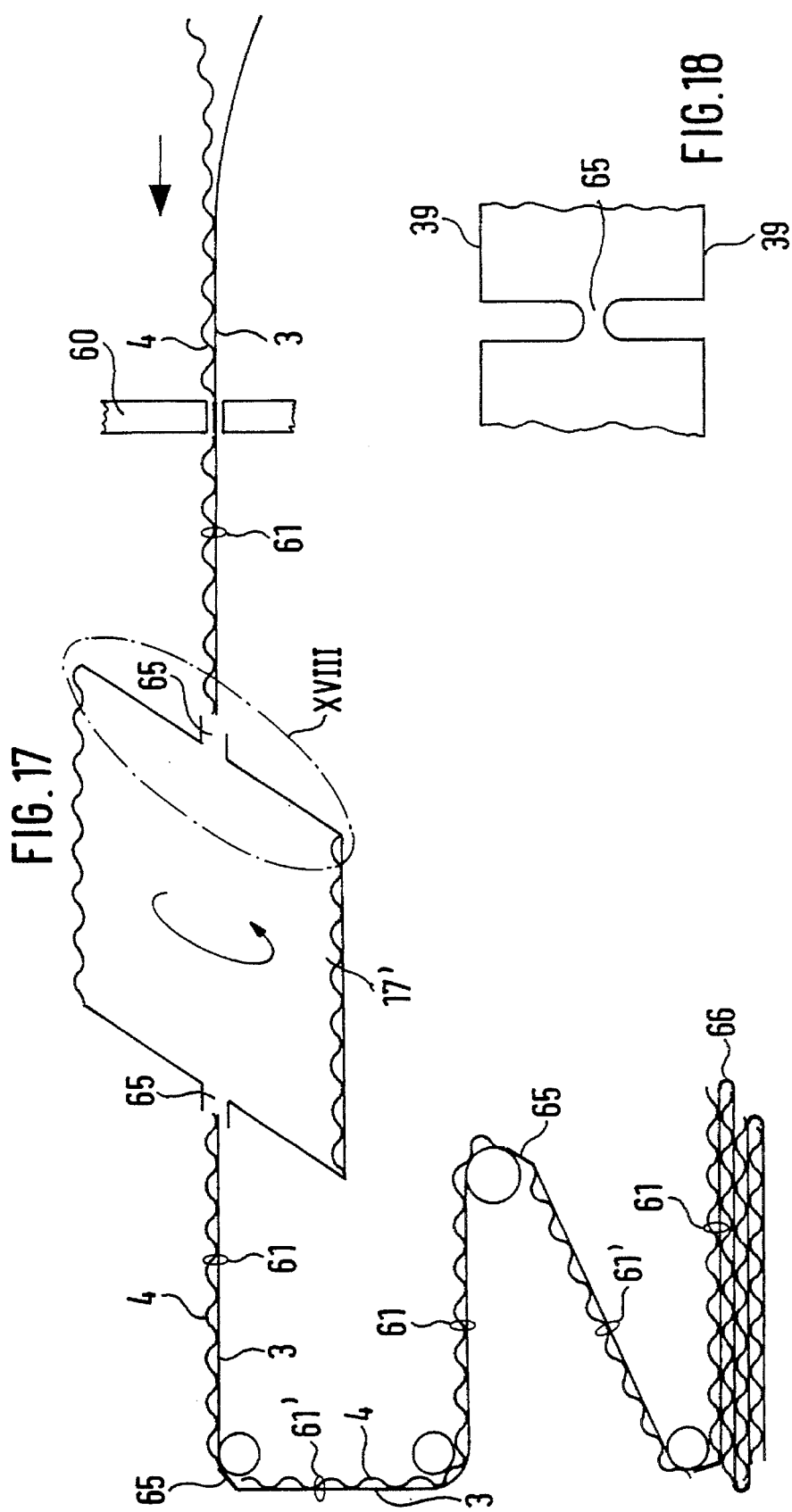

METAL HONEYCOMB BODY OF INTERTWINED SHEET-METAL LAYERS, AND METHOD FOR ITS PRODUCTION

BACKGROUND OF THE INVENTION

1. Field of the Invention

The invention pertains to a honeycomb body, particularly a catalyst carrier body, which is formed of at least partly structured metal sheets defining a plurality of channels through which a fluid can flow.

2. Description of the Related Art

It is known from German published, non-prosecuted application 23 21 378 to produce honeycomb bodies from a ribbon of sheet metal, by providing the sheet-metal ribbon with fold lines, folding it, and inserting it into a cylindrical case. The ribbon is disposed around a center, and both the outer circumferential segments pointing toward the center of the ribbon and those pointing outward form circles. The sheet-metal ribbon itself remains uncorrugated, so that overall, only a few flow channels of large cross section are formed in the honeycomb body. The sheet-metal is covered with catalyst material. A cylindrical void that cannot be utilized for the catalytic conversion process remains in the interior of the metal carrier.

From European application EP 245 737 (corresponding to U.S. Pat. Nos. 4,832,998 and 4,923,109), it is known to produce honeycomb bodies from a number of individual sheet-metal layers. Alternating corrugated and smooth sheet-metal segments are layered into a stack. The stack is then intertwined around two fixed points, producing a honeycomb body whose sheet-metal layers are arranged approximately in the shape of an S. This is the so-called S-form catalyst.

From German published, non-prosecuted application 33 41 868 (corresponding to U.S. Pat. No. 4,647,435), it is known to produce a honeycomb body from a sheet-metal strip folded on itself in a meandering or zig-zag fashion. The strip is provided with prefabricated crease lines at the folding points.

The known prior art has numerous disadvantages. In German 23 21 378, for instance, the catalytically active surface area is too small; especially for use in motor vehicles, a considerably larger catalyst surface area, with simultaneously very compact outer dimensions, are desired. In EP 245 737, the honeycomb body is produced from individual sheet-metal segments. The handling of these segments is problematic, however, because the sheets are very thin and have a very smooth surface and hence can easily stick together. In production, particular care must be taken in this respect. While German 33 41 868 avoids a number of these disadvantages, the honeycomb body is very rigid, so that it does not always withstand thermal strains. Moreover, the way in which the zig-zag layers are folded on one another is very labor-intensive.

European application EP 0 245 736 discloses a honeycomb body in which the individual sheet-metal layers have an involute course in the outer region. This leads to a very uniform structure and great durability in the face of thermal strains. The international publication WO 90/03220 (corresponding to U.S. Pat. Nos. 5,105,539; 5,135,794; and 5,139,844), from which the instantly disclosed invention starts out, also discloses an especially favorable method for producing such honeycomb bodies. Three or more stacks of sheets, which are at least partly structured, are intertwined with one another.

The configurations have many advantages, particularly since the forces due to alternating thermal strains are uniformly distributed in the honeycomb body. One of the disadvantages, as must be pointed out however, is that many sheets have to be cut to a suitable length and then stacked into stacks. The individual sheet-metal layers are also not long enough that electric conductors of sufficient length for heating the honeycomb body or for representative measurement over the entire cross section can be integrated into a single such sheet.

International publication WO 91/14855 also discloses a honeycomb body having at least one integrated electric conductor. When the conductor is laid in a simple, straight course, it can have only a limited length.

SUMMARY OF THE INVENTION

It is accordingly an object of the invention to provide a metal honeycomb body of intertwined sheet-metal layers, and a method for its production, which overcomes the herein-afore-mentioned disadvantages of the heretofore-known devices and methods of this general type and to furnish a honeycomb body with a large catalytically usable surface area, which can be produced with only a few production steps from a small number of metal sheets, and which is able to withstand alternating thermal strains.

It is a further object of the present invention to provide a honeycomb body, particularly a catalyst carrier body in a catalytic converter for cleaning the exhaust gas of motor vehicle engines, which comprises only a small number of metal sheets, is uniform in construction, and the structure of which is also suitable for integrating at least one long electrical conductor in at least one of the sheet-metal layers, or to form one of the sheet-metal layers itself as a long, insulated electrical conductor.

With the foregoing and other objects in view there is provided, in accordance with the invention, a metal honeycomb body, comprising a jacket member defining an interior with a substantially annular inner region and a substantially annular outer region, at least partly structured sheet-metal layers disposed in the interior, the sheet-metal layers being wrapped around one another and extending alternatingly back and forth in a curved fashion between the outer annular region and the inner annular region, and the sheet-metal layers forming loops, and at least three reversal lines defined in the outer annular region, the sheet-metal layers being intertwined about the at least three reversal lines.

In other words, the objects of the invention are attained with a metal honeycomb body having sheet-metal layers, which are at least partly structured, wrapped around one another, which extend alternatingly back and forth in curved, and in particular in approximately involute, fashion between an outer annular region in the vicinity of a jacket region and an inner annular region in a center region and form loops, wherein the body in the outer annular region in the vicinity of its jacket, and in the inner annular region in the vicinity of its center, has at least three reversal lines, around which the sheet-metal layers are intertwined.

In accordance with an added feature of the invention, the jacket member defines a longitudinal axis of the honeycomb body in a center thereof, the reversal lines extend substantially parallel to the longitudinal axis, and the sheet-metal layers are curved in an approximately involute fashion.

In accordance with an additional feature of the invention, the sheet-metal layers are formed by one to five sheet-metal strips having at least in part a corrugation-like structure, and the reversal lines extend through two or more mutually concentric circles.

In accordance with a further feature of the invention, the honeycomb body has a given cross-sectional shape, and the reversal lines are distributed within the jacket irregularly in accordance with the cross-sectional shape of the honeycomb body. By simply distributing the inner reversal lines in a certain way, the resulting honeycomb shape may be varied in a number of different ways.

In accordance with again added features of the invention, the loops are disposed within the inner annular region and the sheet-metal layers substantially fill the inner annular region, or a void of a certain shape is retained on the inside of the honeycomb body, into which no sheet-metal loops extend. The interior void may or may not be supported with a rigid central structure, such as a pipe.

In accordance with again an additional feature of the invention, at least some of the sheet-metal layers are formed of corrugated metal strips having a longitudinal edge, the corrugated strip having a corrugation with troughs and peaks extending in a direction which deviates from a perpendicular to the longitudinal edge of the metal strip by an angle of from 2° to 10°. When the corrugated structures are thus folded onto one another—with their longitudinal edges remaining parallel—the corrugation troughs and valleys intersect one another and form a mutual angle of twice the chosen corrugation angle.

In accordance with again a further feature of the invention, honeycomb body includes a layer with an integrated electrical conductor, the electrical conductor being electrically insulated from adjacent sheet-metal layers, the electrical conductor being, for instance, a hot conductor for heating the honeycomb body or a measurement sensor.

In accordance with yet an added feature of the invention, the layers are formed of at least partly corrugated sheet metal strips and smooth sheet-metal strips each extending along a longitudinal axis, the layers being folded one on top another and defining apex points at the loops, the sheet-metal strips having lateral edges into which mutually opposed cut-outs are formed at the apex points such that a relatively narrower web is defined between the cut-outs and strip segments are defined between the apex points, adjacent ones of the strip segments being rotated relative to one another by 180° about the longitudinal axis.

With the objects in view, there is further provided, in accordance with yet another feature of the invention, a honeycomb body, comprising a stack of sheet-metal layers disposed in the form of an S, the stack being formed of a corrugated, smooth or corrugated and smooth sheet-metal strip folded in zig-zag fashion.

With the above-noted objects in view, there is also provided, in accordance with the invention, a method for producing a metal honeycomb body of at least partly structured sheet-metal layers. The method comprises the steps of:

a) forming a multi-layer hollow coil with an inside and an outside from at least one sheet-metal strip which has at least partial structuring;

b) defining an inner annular region and an outer annular region on the inside of the multi-layer coil;

c) deforming the multi-layer hollow coil from the outside thereof towards the inside at at least three lines distributed about a circumference of the multi-layer hollow coil, and forming a corresponding number of inner reversal lines in the inner annular region and outer reversal lines in the outer annular region, such that the at least one sheet-metal strip extends in loops between the outer and inner reversal lines; and d) compacting the resulting deformed multi-layer structure about the inner reversal lines by rotationally intertwining the loops in a given direction.

As will also be described in detail in conjunction with the drawing, such a honeycomb body can easily be produced from a hollow coil by folding it in a star shape and then wrapping the "points of the star" around one another. The hollow coil comprises structured metal sheets wound in a spiral around one another, which form a hollow cylinder whose outer radius is R and whose inner radius is r. The cross-sectional area of the hollow cylinder, i.e. the area about which the sheet-metal layers are distributed, is in fact $\pi (R^2 - r^2)$ and is approximately equivalent to the cross-sectional area of the honeycomb body to be produced later from the hollow coil. In the simplest case, the hollow coil consists of a single-flight spiral of one smooth and one corrugated metal sheet, but the possibility also exists of producing a multi-flight spiral from alternating smooth and corrugated sheets, for instance. Alternating layers of differently structured sheets are also possible, such as sheets corrugated obliquely at an angle, many versions of which are known from the prior art. By way of example, the hollow coil can be produced easily by winding the sheet-metal layers onto a cylindrical core.

Next, however, the hollow coil is not pressed flat and then intertwined, as known from the prior art, such as European application No. 332 891 B1, but instead is pressed in from the outside inward at at least three points, forming a star shape. The "points" of the star may be wrapped in the same direction around the center of the star, forming a desired cross section filled closely with structured sheet-metal layers. The individual sheet-metal layers then have an approximately involute course, except that, unlike the prior art, the sheet-metal layers are self-contained so that no free ends emerge on the outside; instead, only the curved backs of sheets are located on the outside.

The number of reversal lines, which is the same for both directions of curvature, should preferably be at least 4 each on the inside and on the outside. In certain applications, particularly when a honeycomb body that has a hollow inner annular region is to be produced, an even larger number is in fact desirable. The difference between the outer and inner radii (R–r) of the hollow coil and the number of reversal lines, as well as their initial distribution over the circumference of the hollow coil, determine the later shape of the cross section or in other words the size of a hollow inner annular region.

In principle, the hollow coil can be built up in many ways; preferably, 1 to 5 sheet-metal strips are used, which at least in part have a corrugation-like structure. "In part" means that either one sheet-metal strip has this structure in some regions, or that some of the sheet-metal strips have this structure. For instance, it is possible to produce a hollow coil from a single sheet-metal strip which is smooth over half its length, for instance, and corrugated on the other half and then is folded together. A configuration with one smooth and one corrugated sheet-metal strip or a plurality of such strips is also possible; all the structures and substructures of the sheets known from the prior art may be used. The hollow coil preferably has a total of 3 to 7 layers, each of which is produced by winding up the 1 to 5 sheet-metal strips.

The present invention is especially highly suitable for honeycomb bodies in which at least one electric conductor that is electrically insulated from the honeycomb body is to be integrated, the conductor being embodied as a hot conductor and/or as a measuring sensor. To produce a temperature sensor that representatively measures over the cross section of the honey comb body, it is important incorporate a relatively long conductor. The same is true for a hot wire in electrically heatable honeycomb bodies. Here, the present invention offers the advantage, over honeycomb bodies that comprise a number of individual sheets, that a long conductor, such as a wire, can be integrated into one of the sheet-metal layers without difficulty, preferably a corrugated sheet-metal layer. As is known, an electrical conductor can thus be disposed in a jacket conductor, for instance, and rolled in between two sheet-metal layers. Any other way of integrating an electrical conductor into a sheet-metal layer is also possible, such as laying it into a slit, corrugated sheet-metal layer. Ducting the electric conductor through a window into a jacket tube that might optionally surround the honeycomb body can be done, for instance, in accordance with international publication WO 93/05284, which teaching is hereby expressly incorporated by reference.

In general, a honeycomb body according to the invention is surrounded by a jacket tube, and the outermost sheet-metal layer touches the tube along lines of contact in the vicinity of the outer reversal lines. To secure the honeycomb body in the jacket tube, the outermost sheet-metal layer may be joined to the jacket by brazing, at least in subregions of its contact lines with the jacket.

The sheet-metal layers are preferably also joined to one another by brazing, at least in subregions. Such brazing connections are preferably made at one or both end faces of the honeycomb. The end faces of the honeycomb body are defined at the entry point of the fluid into the body and the exit point of the fluid out of the body.

In paraphrasing the claimed method, the production of the honeycomb body from sheet-metal layers follows these steps:

a) a hollow coil with a plurality of sheet layers, preferably 3 to 10 sheet layers, is wound from 1 to 10, and preferably 3 to 5 sheet strips (3, 4), which are at least partly structured; the hollow coil is, in fact, an annular ring and possibly a multi-layer annular ring;

b) the hollow coil, supported from inside, is deformed from the outside inward at at least three lines, so that a corresponding number of reversal lines are formed both in an outer annular region and in an inner annular region;

c) the resultant starlike structure is compacted by rotational intertwining of the outer reversal lines, relative to the inner reversal lines.

As will be seen in further detail from the description of the drawing, this production method is very rapid and simple and has only a few individual steps. Nevertheless, by a suitable selection of the dimensions of the hollow coil and of the number of reversal lines, which moreover need not be distributed uniformly over the circumference of the hollow coil, several different forms may be produced, analogously to the range of forms already known from the prior art. The reversal lines, as shown in the drawing, may also be located on a plurality of concentric circles or distributed irregularly in the finished honeycomb body, in order to produce special shapes.

For instance, the hollow coil may be deformed from the outside inward at at least four lines; to form non-round cross sections, the reversal lines are circumferentially spaced apart at uneven intervals.

It is completely unproblematic in this production process to integrate at least one sheet-metal strip, which is formed of two sheet-metal layers in close contact with one another between which at least one electrical conductor is integrated in an electrically insulated manner. Without any change whatsoever in the production process, a very long electrical conductor can in this way be distributed uniformly over the circumference of the honeycomb body and can serve as a measurement probe or sensor or as a hot conductor.

As also known in the prior art from which the instantly disclosed invention starts out, one of the substantial advantages of the present invention is that a honeycomb body with a hollow inner central region can be formed in a simple way. That configuration need not even be supported by a central tube.

The honeycomb body is preferably produced from a thin corrugated metal strip—the material thickness is approximately 0.02 mm to 0.1 mm. The corrugated strip extends in alternation from a center to a jacket and from there back to the center. Each location of the corrugated strip then comes to rest on the adjacent layer of the strip, producing a spiral or involute structure for the metal carrier, with a plurality of axially extending channels. The radially inwardly pointing loops of the metal strip rest with their apices inside the center, which they actually fill virtually completely. The distribution of the loops in the center need not be symmetrical. The radially outwardly pointing loops are wrapped around the radially inner loops and hence about the center, producing the spiral form already described. The outer regions of the loops are joined to a surrounding jacket housing by fastening techniques or in a form-locking fashion.

Because the corrugated sheet rests on itself in a looped fashion, care must be taken so that the corrugations of two corrugated sheet layers resting on one another will not nestle into one another. Rather, channels of a defined cross section which allow a fluid flow need to be maintained. This problem is solded by way of a special corrugation shape in the corrugated strip, for instance in accordance with German published, non-prosecuted application 33 47 086. However, the corrugation may also be impressed obliquely with respect to the longitudinal course of the strip. It has proved especially advantageous for the corrugation to deviate by about two to ten degrees from being perpendicular to the edge of the corrugated strip. When the corrugated strip is folded onto itself in looped or zig-zag form, the corrugations of the strip thus intersect one another (by twice the chosen angle), thereby preventing the corrugated strips from sliding into one another.

Another option for preventing two corrugated strips from falling into one another is to insert smooth divider strips. Preferably the corrugated strip is disposed between two smooth strips. If the thus-arranged smooth and corrugated strips contact one another in looped or zig-zag fashion, the smooth strip on the inside in each case comes to rest on itself, so that the corrugated strip is always supported on this double smooth strip layer, and the smooth strip can be selected as suitably thin, for instance being 0.02 mm thick.

In a further preferred embodiment, a plurality of corrugated and smooth strips are incorporated into the honeycomb body. Then each corrugated strip is disposed between two smooth strips, so that a smooth strip always alternates with a corrugated strip. The outer layer should be a smooth strip, because otherwise in a looped or zig-zagged arrangement two sides of a corrugated strip would come to rest on one another. As a result of this arrangement with multiple smooth and corrugated strips one on top of the other, it is possible to fill even relatively large honeycomb body cross sections, without having to increase the number of loops or wrappings around the center to a great extent.

Another option for separating the looped corrugated sheets is to slide individual smooth strip segments in between the corrugated strip layers. Then the sheet-metal segments are inserted between the corrugated strip layers both from the center and from the edge, so that the smooth strip segments are in approximately a star-shaped arrangement. The smooth strip segments pointing outward are wrapped with the radially outer loop around the center and are joined to the jacket by fastening techniques, such as brazing, or in a form-locking fashion.

To prevent two layers of corrugated strip material from sliding in one another, one layer of smooth strip may for instance be inserted between them. To that end, one smooth strip and one corrugated strip are placed on one another. At the apex points of the loop, both strips are simultaneously cut out or stamped out from both edges, so that only a narrow web remains in the middle of the strip. The smooth and corrugated strip segments between two such narrow webs are the twisted about the longitudinal axis by 180° relative to the adjacent strip segment. When the strips are then laid on one another in looped or zig-zag form, in which the segments correspond to the width of the zig-zag stack, a smooth layer and a corrugated layer always come to rest on one another.

As described above, the honeycomb body is produced by winding up at least one corrugated metal strip to make a single-layered or multi-layered hollow coil. The corrugated strip is placed over winding mandrels, which at the same time are disposed on a circle having the inside diameter D1. The number of winding layers is determined by the desired thickness of the loops subsequently made, which in turn depends on the required diameter of the honeycomb body. The number of winding mandrels is as a rule selected such that it matches the number of loops required to produce the metal carrier, so that once the loops have been intertwined around the center, the corrugated strip will precisely fill the interior of the honeycomb body.

In the second processing step, the corrugated strip is pulled in between the winding mandrels toward the center of the honeycomb body. To that end, draw-in mandrels are brought from the outside against the circle made by the corrugated strip, and the corrugated strip is also drawn into the center by these draw-in mandrels, in the course of which the winding mandrels yield resiliently, so that the corrugated strip will not be overstretched. After the drawing in, the corrugated strip, which before was arranged in a circle, is now deformed into a rosette shape, and the winding mandrels are now disposed on a reduced circular diameter D2.

In the next production step, the winding mandrels are removed. The radially outer loops are wrapped around the radially inner loops. In the process, the corrugated strips are pressed against the neighboring corrugated strip layers, producing a spiral structure with the outside diameter D3 for the honeycomb body. During the intertwining process, the drawn-in mandrels serve as retainers for the loops, so that these loops are fixed in the center region. Finally, the honeycomb body produced in this way is inserted into a jacket and fastened thereto by fastening techniques or in a form-locking manner.

This production method may be modified so that during the winding of the corrugated strip onto the winding mandrels, two smooth sheets are additionally delivered, so that the corrugated strip runs between the two smooth strips. This is necessary whenever the embossing of the corrugated strip does not prevent two corrugated strip layers resting on one another from slipping into one another, as can happen with a simple sinusoidal corrugation, for instance.

Given the requirements of modern automotive engineering, honeycomb bodies that deviate from the circular form are often used. The elliptical or stadium-shaped metal carriers that are often used are produced by embodying the center of the metal carriers not in point or circular form but rather that it assumes virtually a linear form. Elliptical metal carriers can accordingly be produced so that the radially inner loops are pulled into a straight line, which approximately connects the two foci of the ellipse. Other forms of honeycomb bodies can be produced easily in this way, and for different geometrical versions the center is adapted appropriately, for example being curved.

Honeycomb bodies of several special geometrical shapes cannot be produced in the foregoing manner. An example therefor being bone-shaped honeycomb bodies. To produce those shapes, it is proposed that the lengths of the loops not be made uniform but rather varied. This makes it very simple to change the external form of the honeycomb body.

A further version or honeycomb bodies is to arrange stacked corrugated and smooth sheets in an S-shaped configuration in a jacket. This kind of embodiment can also be achieved with a single smooth and/or corrugated strip. A stack of metal strips placed in zig-zag fashion on one another is made and then intertwined about two fixed points, producing the aforementioned S-shaped configuration.

Other features which are considered as characteristic for the invention are set forth in the appended claims.

Although the invention is illustrated and described herein as embodied in a metal honeycomb body of intertwined sheet-metal layers, and method for its production, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 17 a diagrammatic view of the honeycomb body with twisted sheet-metal strip segments;

FIG. 18 is a partial view of a detail of a sheet-metal strip segment with a web;

FIG. 21 is a similar view of the corrugated strip disposed in a rosette shape, smooth strip segments thrust in between.

DESCRIPTION OF THE PREFERRED EMBODIMENTS

Figure 1:
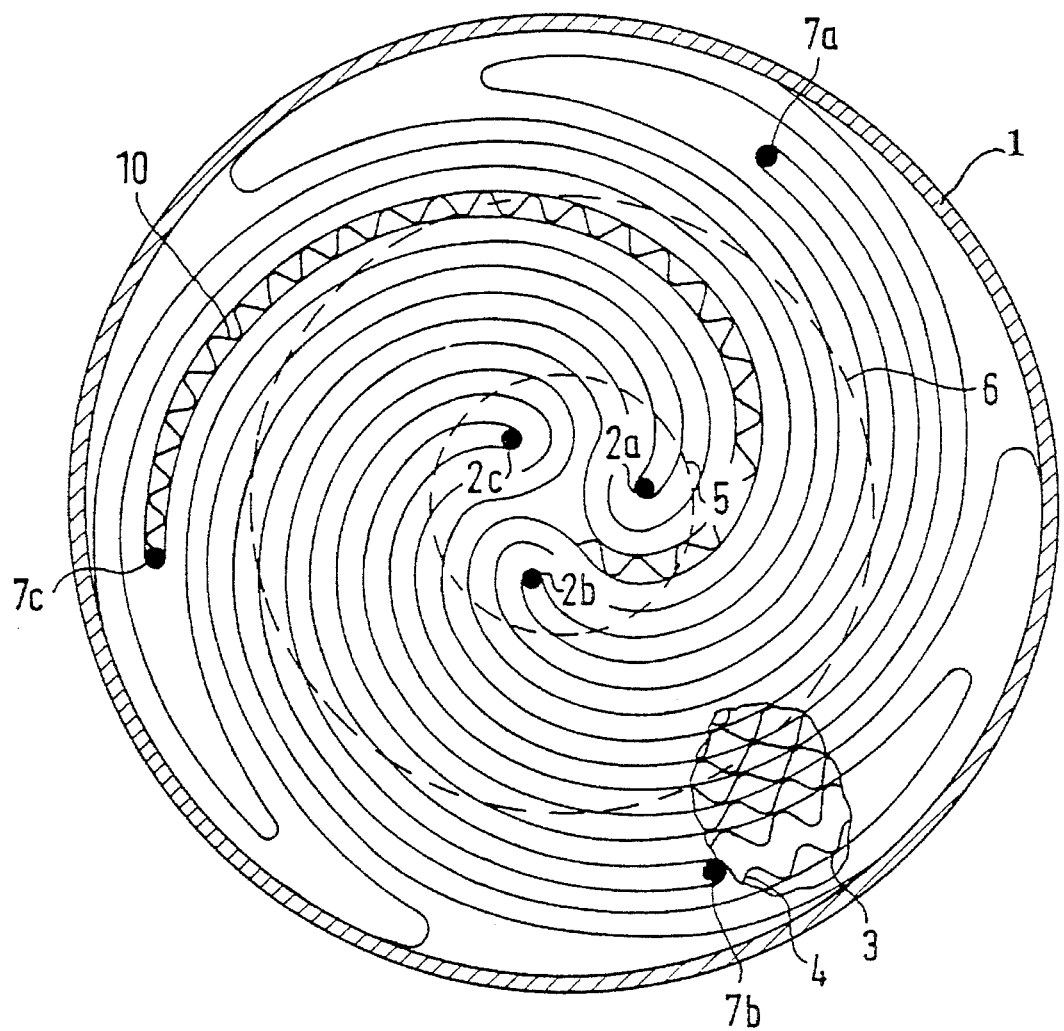
FIG. 1 is a cross-sectional view of a first embodiment of a honeycomb body according to the invention.

Referring now to the drawings in detail, and first, particularly, to FIG. 1 thereof, there is seen a schematic cross-sectional view showing the construction of a honeycomb body of the invention, using a round cross section as an example. The honeycomb body comprises alternating smooth sheet-metal layers 3 and corrugated sheet-metal layers 4 disposed in a jacket tube 1. The illustrated corrugations are simple sinusoidal corrugations with rounded troughs and peaks. It is understood, however, that any number of corrugation types may be employed in conjunction with the invention. Three or more inner reversal or inversion lines 2a, 2b, 2c, . . . are located within an inner annular region 5, and an equal number of outer reversal lines 7a, 7b, 7c, . . . are located in an outer annular region defined between a dashed circle 6 and the jacket 1. The sheet-metal layers 3, 4 wind around these reversal lines, each layer alternating in its direction of curvature, and extend in a curve between each two reversal lines, preferably in an approximately involute fashion. The lines of contact of the outermost sheet layer with the jacket tube 1 may, at least in partial regions, be joined to the jacket tube by brazing. To avoid having sheet layers of the same structure rest on one another, additional intermediate layers 10 may be provided, which are laid in or inserted during an intervening step during the deformation. It is noted that the cross-sectional view of most of the figures may also be denoted end faces of the honeycomb bodies. In a preferred embodiment, the sheet-metal layers 3 and 4 are brazed to one another, at least in subregions of their mutual lines of contact, in the vicinity of the end faces.

Figure 2:
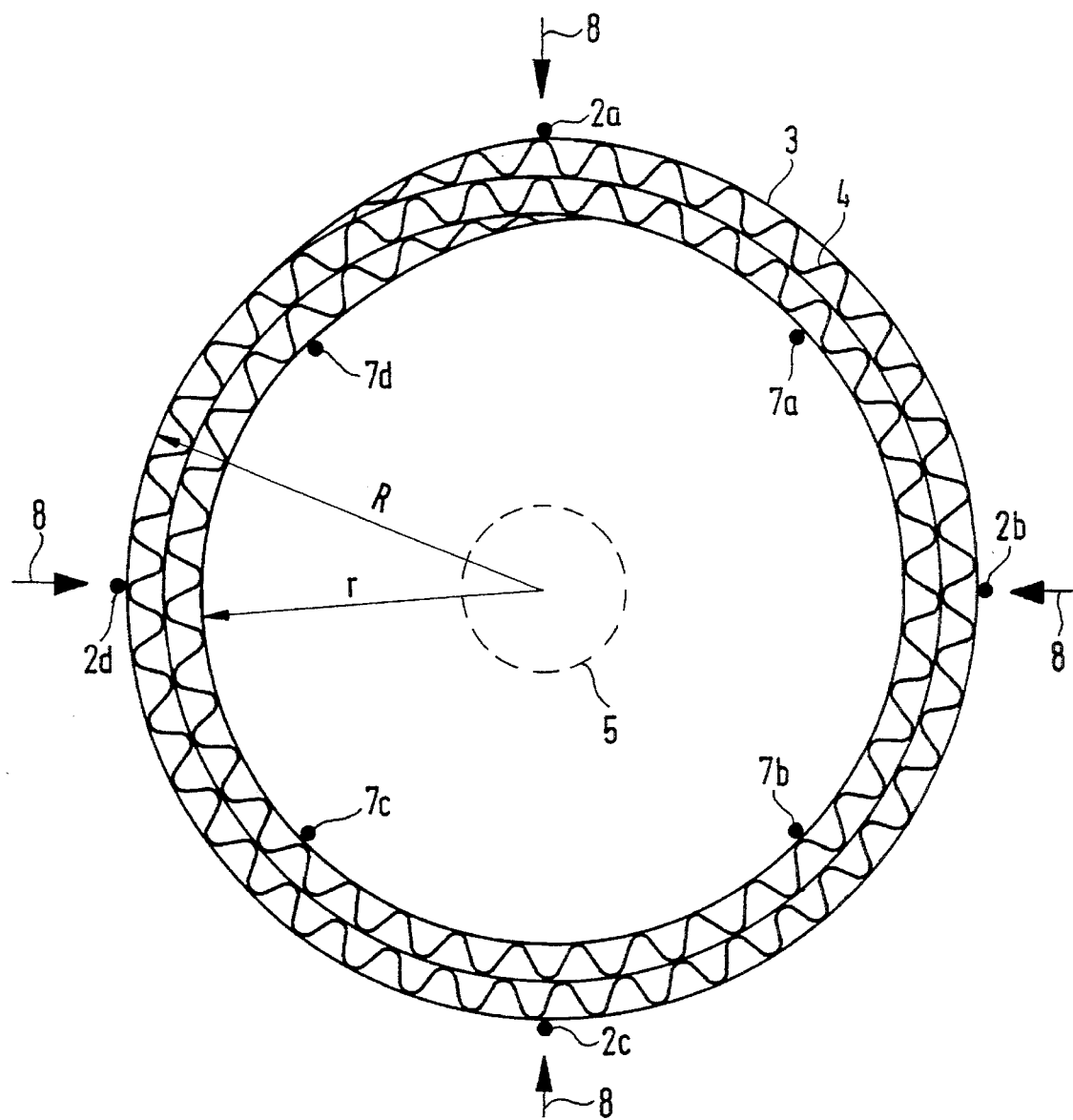
FIG. 2 is a schematic cross-sectional view of a hollow coil from which the honeycomb body of FIG. 1 may be formed.
Figure 3:
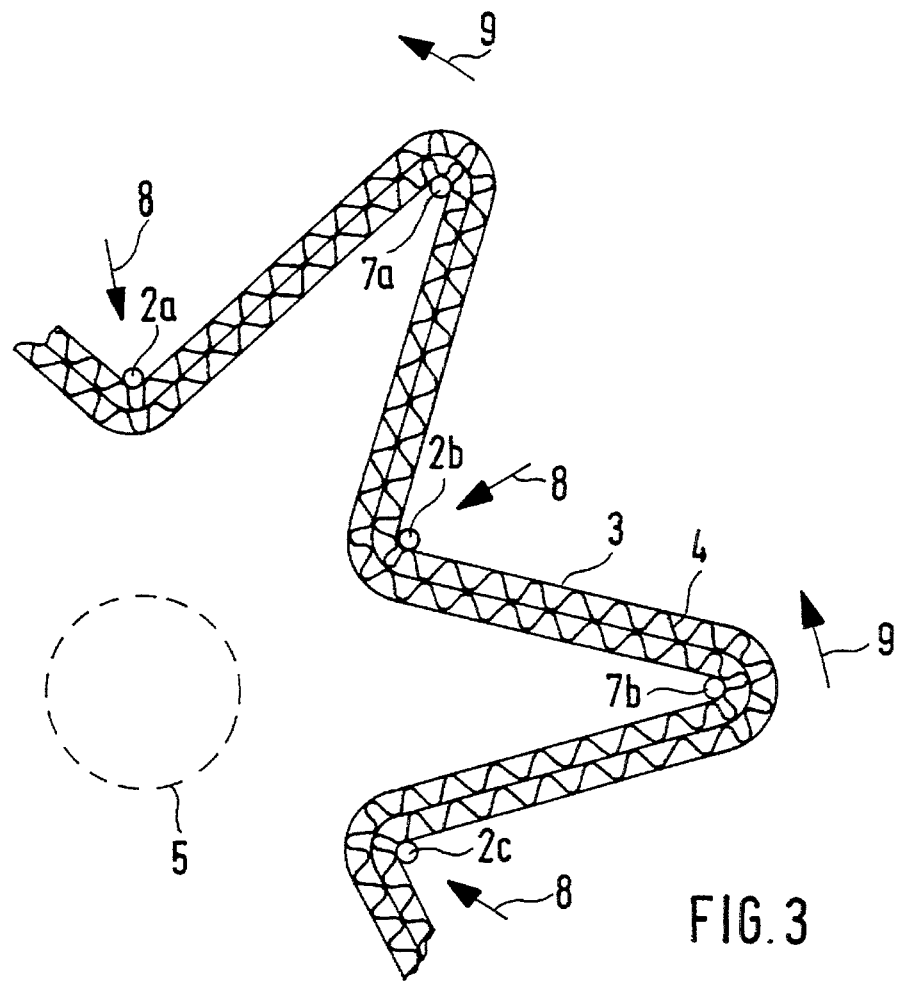
FIG. 3 is a partial view of the hollow coil of FIG. 2, partially deformed into a star shape.

FIG. 2 shows a schematic cross section of a hollow coil from which a honeycomb body of the invention can be produced. In this exemplary embodiment, the hollow coil comprises one smooth sheet 3 and one corrugated sheet 4, which are wound in alternation in a spiral to make a hollow cylinder. This hollow cylinder is defined by five layers A–E and has an outer radius R and an inner radius r, as measured from a center point which lies on a longitudinal axis of the honeycomb body. By pressing the hollow coil inwardly at the reversal lines 2a, 2b, 2c, 2d, the coil can be deformed to make a star-shaped structure. Under some circumstances, the hollow coil might need to be supported from the inside at the reversal lines 7a, 7b, 7c, 7d, in order to achieve uniform deformation. As a result of this deformation, the reversal lines 2a, 2b, 2c, 2d come to be located within the inner annular region 5, while the reversal lines 7a, 7b, 7c, 7d initially form the "points" of a star. An intermediate state along the way to this form is shown in a schematic detail in FIG. 3. The arrows 8 represent the direction of motion inward of the reversal lines 2a, 2b, 2c, 2d. If the "points" of the star are then compacted, as indicated by arrows 9, by rotary twisting in the same direction of the outer reversal lines 7a, 7b, 7c, 7d relative to the inner reversal lines 2a, 2b, 2c, 2d to make a tight body, then the desired form of a honeycomb body is obtained.

Figure 4:
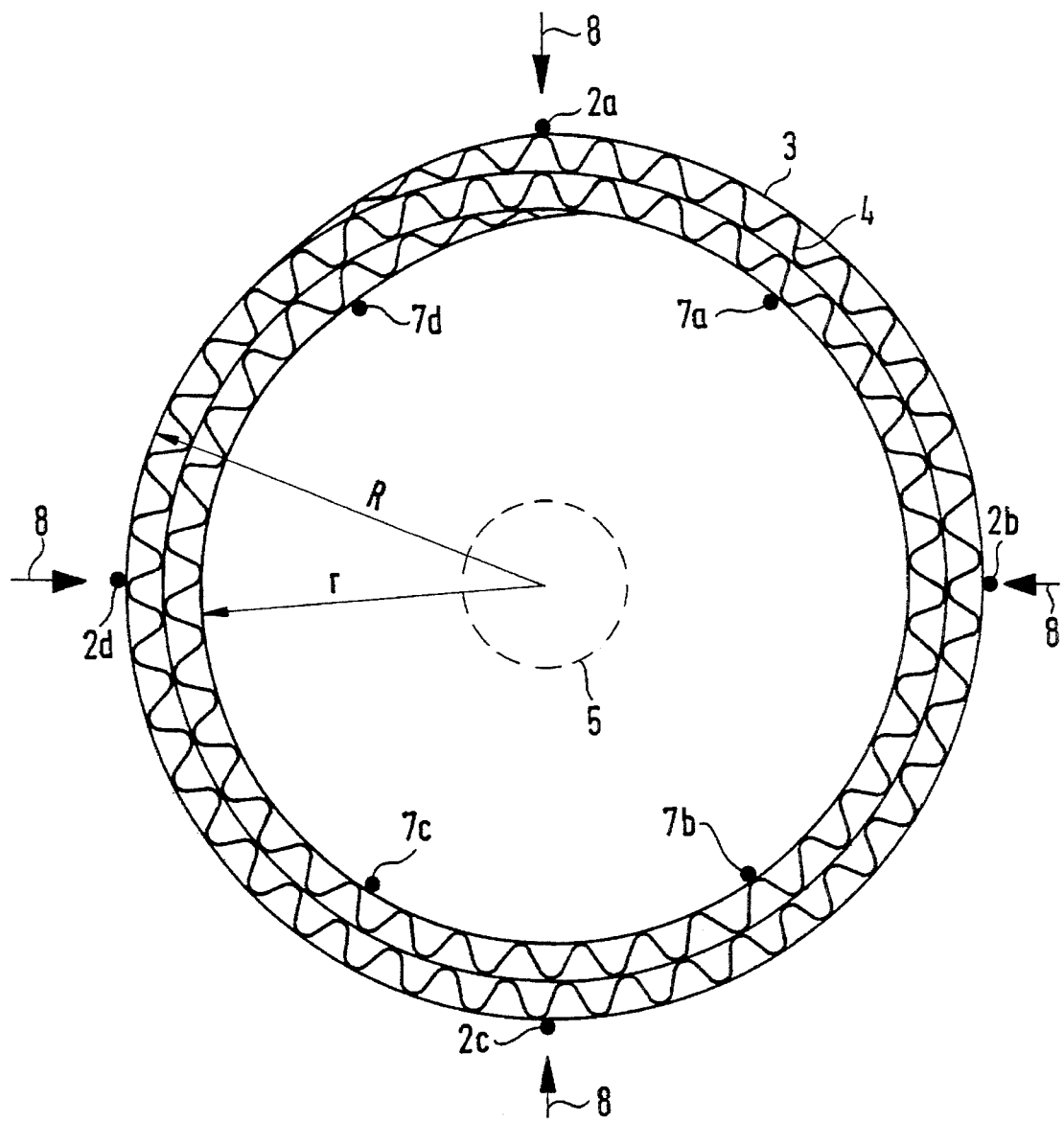
FIG. 4 is a view similar to that of FIG. 2 with a distribution of reversal lines for the formation of a second, i.e. oval, embodiment of the honeycomb body.

FIG. 4 shows the initial disposition of the reversal lines 7a, 7b, 7c, 7d and 2a, 2b, 2c, 2d for forming an oval honeycomb body. The reversal points 7a, 7b, 7c, 7d are not distributed uniformly over the inside circumference of the hollow coil but instead are located at the corners of a rectangle (rather than a square as in FIG. 2), so that with the star-shaped deformation and later intertwining, an oval cross section is formed.

Figure 5:
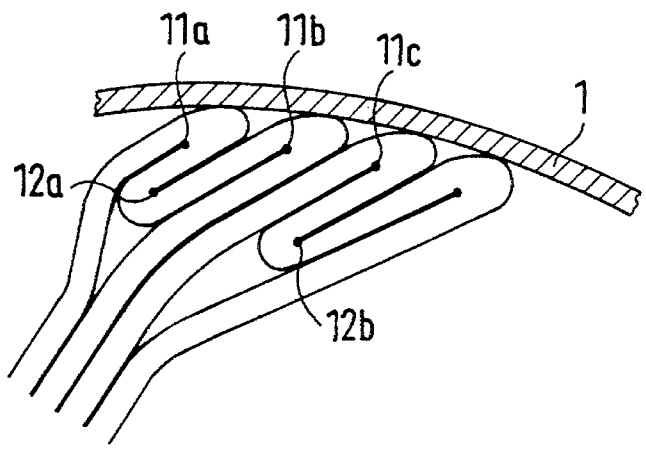
FIG. 5 is a schematic view of a further exemplary embodiment with reversal lines distributed over a plurality of concentric circles.

FIG. 5 shows an exemplary embodiment that can be preferably employed whenever a larger number of connection points with the jacket 1 are desired in the outer region and whenever a steeper angle of contact of the outer sheet layer is desired. By means of additional reversal points 11a, 11b, 11c and 12a, 12b, . . . , the desired structure in the outer region can likewise be formed from a hollow coil.

Figure 6:
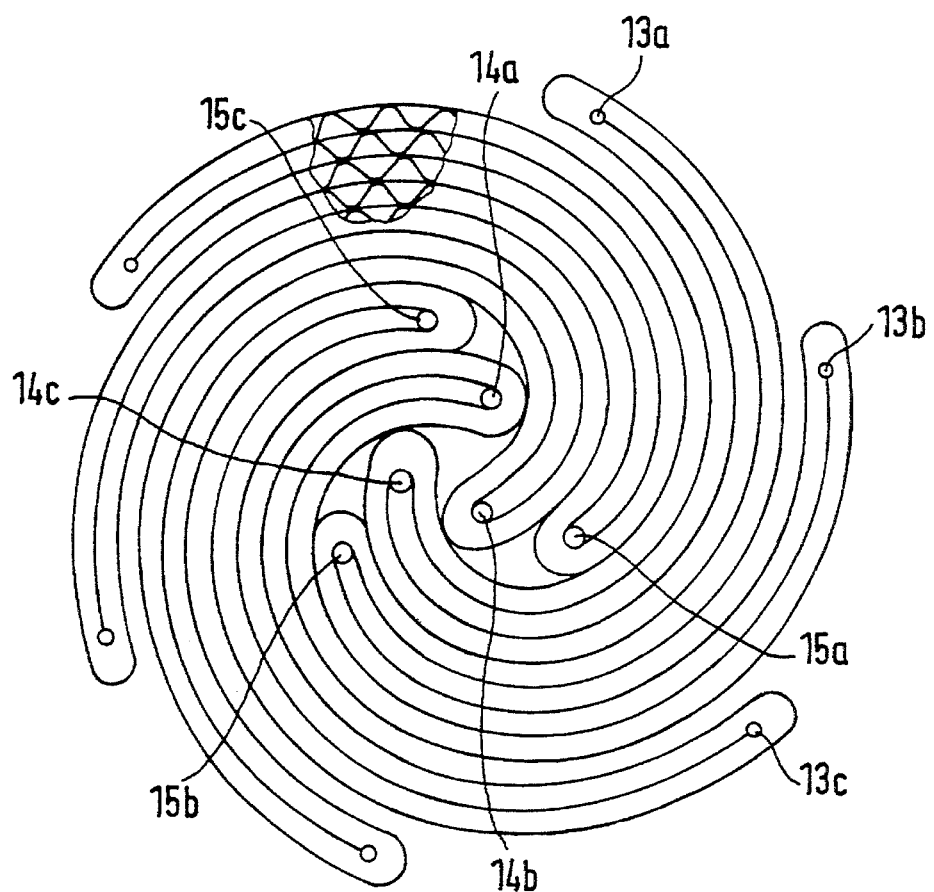
FIG. 6 is a cross-sectional view of an embodiment with an irregular distribution of the reversal lines.

FIG. 6 schematically shows how an overly large internal void can be avoided, if that should be undesirable, when there is a relatively large number of outer reversal lines 13a, 13b, 13c, . . . and inner reversal lines 14a, 14b, 14c, . . . and 15a, 15b, 15c . . . . To that end, some of the inner reversal lines 14a, 14b, 14c are located on a circle having a smaller radius than that of the other inner reversal lines 15a, 15b, 15c.

Figure 7:
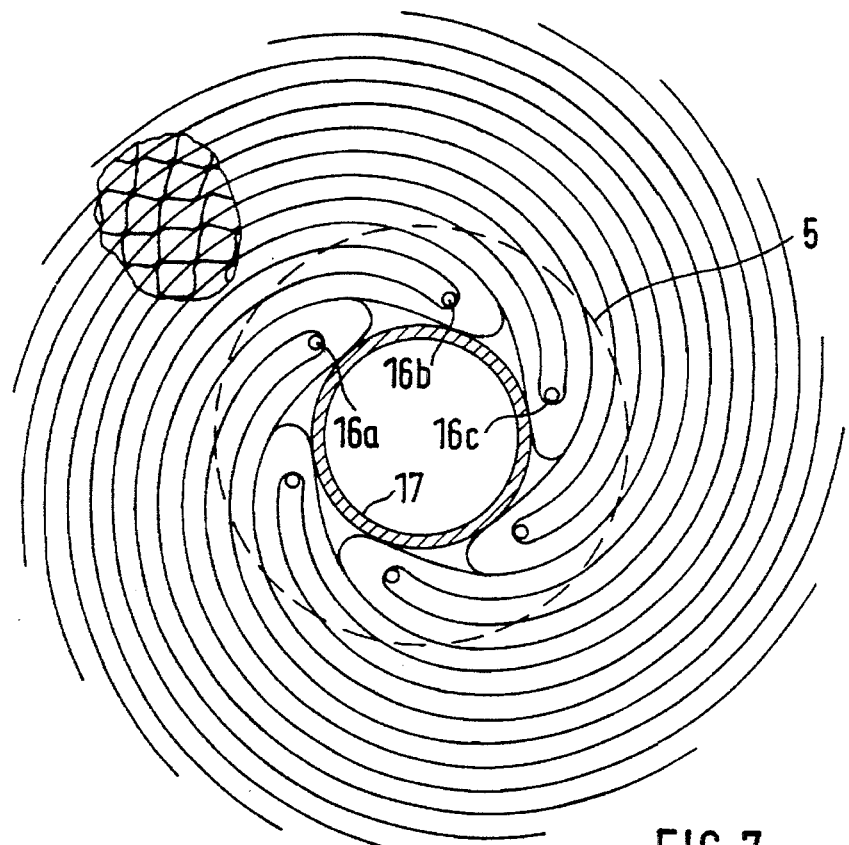
FIG. 7 is a similar partial view of a honeycomb body with a hollow inner central region.

FIG. 7, by contrast, shows how a hollow inner central region, as defined by a tube 17, is formed. All of the inner reversal lines 16a, 16b, 16c, . . . are located on a concentric circle within the interior of the inner annular region 5.

Figure 8:
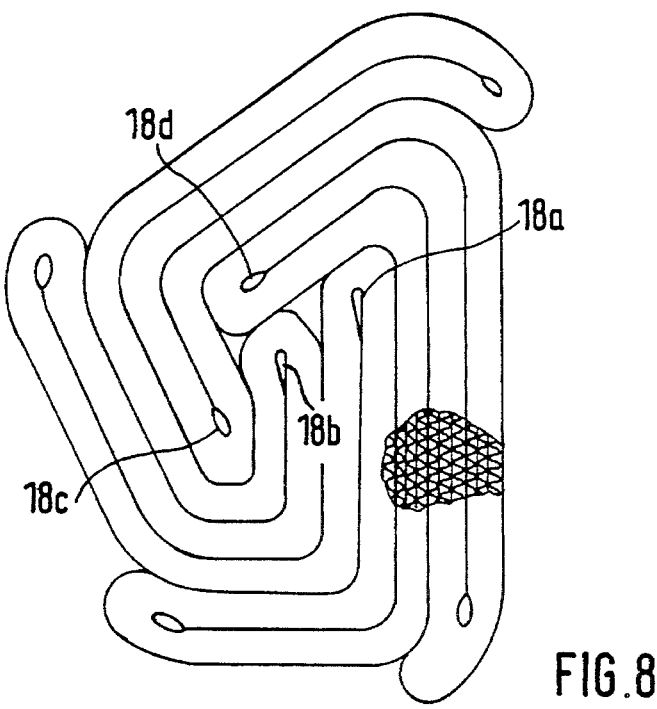
FIG. 8 is a similar view of a honeycomb body with an irregular cross sectional shape.

FIG. 8 schematically shows an example of how irregular cross sections can be filled according to the invention. Here the inner reversal lines 18a, 18b, 18c, 18d are irregularly located in the interior, and as a result a correspondingly irregular cross section can be filled up in the intertwining process.

Figure 9:
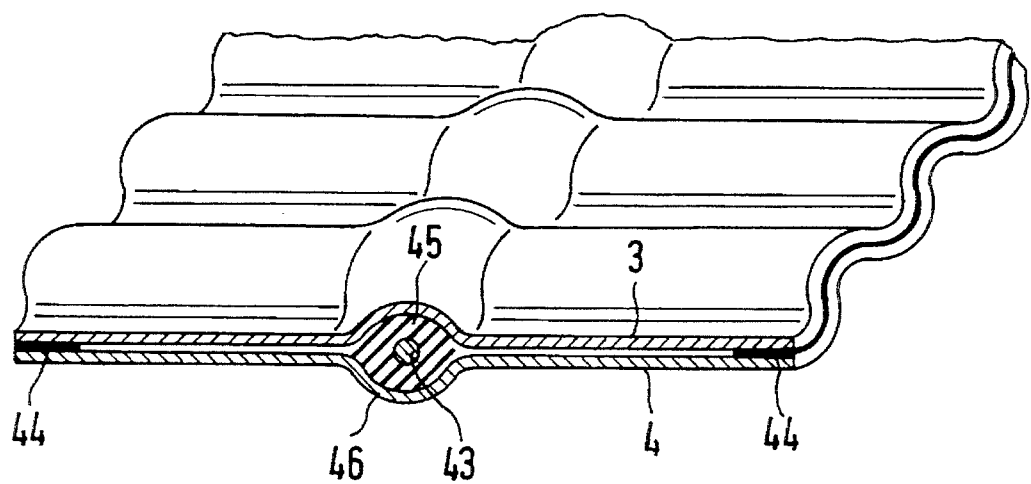
FIG. 9 is a partial, perspective view of a corrugated sheet-metal layer with an integrated electrical conductor for integration in a honeycomb body according to the invention.

FIG. 9 shows how an electrical conductor 43, insulated and separated from the metal sheets 3 and 4 by an insulation 45, can be disposed within one sheet layer. The layer is comprised of two individual sheets 3 and 4. The sheets 3 and 4 have a bulge 46 on one or both sides, and the other electrical conductor 43, electrical lead, probe, heater or the like, is laid in this bulge. The individual sheets may be joined at their face ends by a brazed connection 44.

Virtually nothing in the described production process for honeycomb bodies is changed if instead of a single corrugated layer, a double layer with an integrated electric conductor as in FIG. 9 is used.

Figure 10:
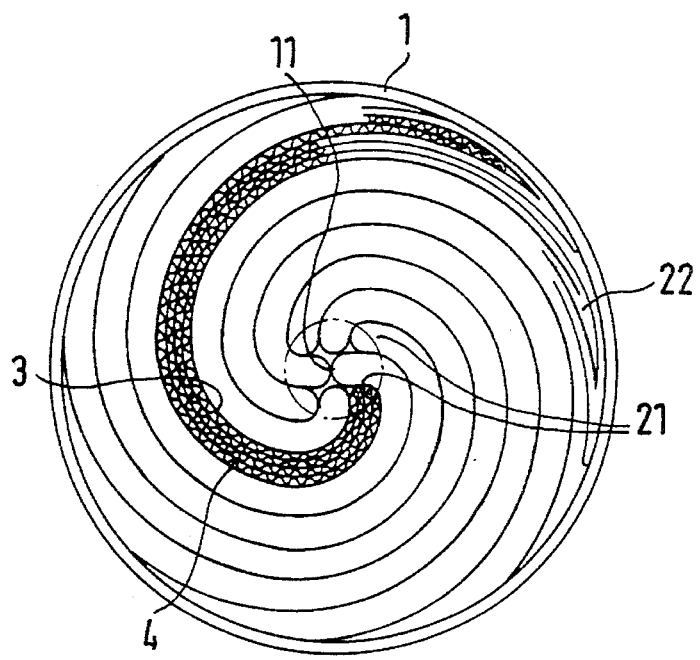
FIG. 10 is a schematic cross-sectional view of a round honeycomb body.

FIG. 10 schematically shows another embodiment of a circular honeycomb body configuration. Here the sheet metal layers 3 and 4, laid on one another in looped form, are disposed in an inner annular region 5 that is disposed coaxially around the center 11 of the honeycomb body. The sheets are intertwined about the center 11. In the process, the radially inner loops 21 fill the center 11 completely. The radially outer loops 22, with their outsides, touch the enveloping jacket 1, to which they are joined by metal fastening techniques (e.g. brazing) or in a form-locking manner. It is noted, in this context, that a form-locking connection is one which connects two elements together due to the shape of the elements themselves, as opposed to a force-locking connection, which locks the elements together by force external to the elements. The structure of the honeycomb body is nearly spiral, and the spirals originate approximately at the circular center 11. The spacing of the spirals from one another is substantially constant, because the spacing is defined by the amplitude of the sheet layers 3 and 4.

Figure 11:
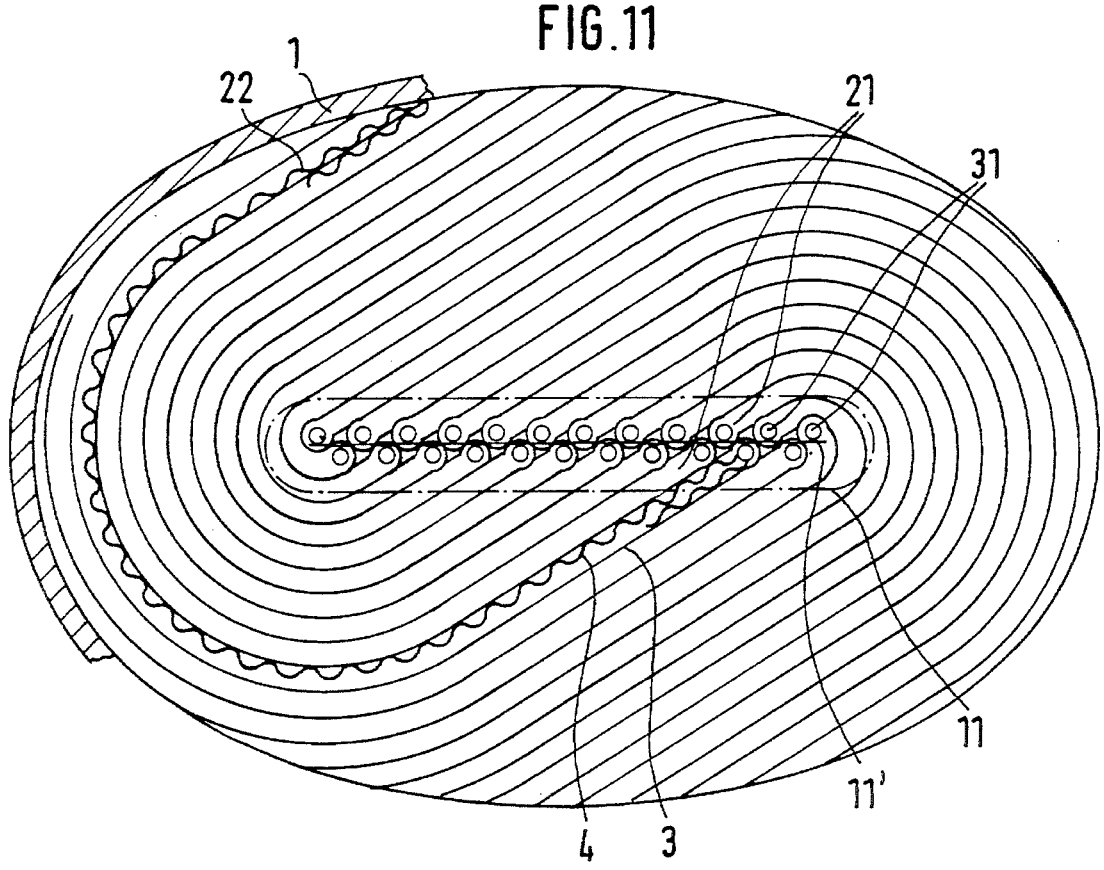
FIG. 11 is a similar view of an elliptical honeycomb body.

In FIG. 11, an elliptical honeycomb body is shown. Here the sheet layers 3 and 4 are laid on one another in looped fashion and drawn with the radially inner loops 21 to make a striplike center 11, which is disposed in the middle of the honeycomb body, approximately surrounding a straight line 11' that connects the foci of the ellipse. The inner loops 21 completely fill the center 11. The radially outer loops 22 are intertwined around the center line 11, and the individual layers of the sheets 3 and 4 come to rest on one another. Once again, the structure of the honeycomb body is spiral. The number of loops 21 and 22 depends on the size of the area of the honeycomb body to be filled. In this example, 23 inner loops 21 are folded about draw-in mandrels 31 and pulled towards the center 11. The number of inner loops 21 or drawn-in mandrels 31 may be increased or decreased arbitrarily. The outer loops 22 rest with the corrugations of the sheet layers 3 and 4 on the surrounding jacket 1 and are joined to it by fastening techniques or in a form-locking way.

Figure 12:
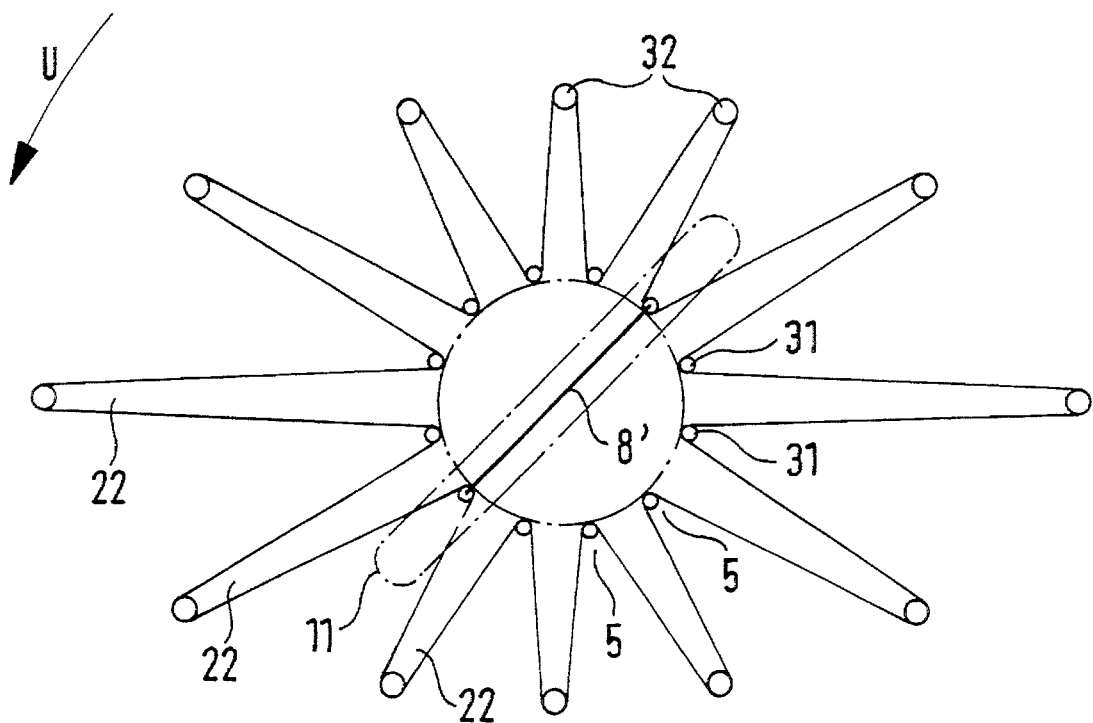
FIG. 12 is a schematic view of a honeycomb body prior to the intertwining, with loops of different lengths.

FIG. 12 shows a honeycomb body with loops of different lengths prior to the intertwinings. Here the sheet layers 3 and 4, extending over the winding mandrels 32, have been drawn by the draw-in mandrels 31 with different spacings, resulting in a variable loop length. The draw-in mandrels 31 are drawn toward the striplike center 11, and in this example the draw-in mandrels 31 have not yet reached the center 11. After the winding mandrels 32 are removed, the outer loops 22 are then wrapped around the center 11 in the wrapping direction U.

Figure 13:
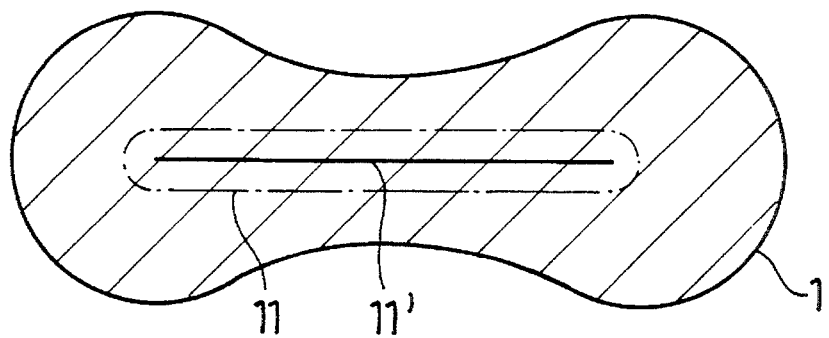
FIG. 13 is a similar view of the honeycomb body after the intertwining, with loops of different lengths.

FIG. 13 shows a "bone-shaped" honeycomb body, which is produced from the sheet layers 3 and 4 arranged in loops, as shown in FIG. 12. Here the center 11 is striplike; it encloses the straight line 11' that connects the foci of the two knob-shaped ends. The honeycomb body is inserted into a jacket 1 and joined to it by either fastening techniques or by means of a form-lock.

Figure 14:
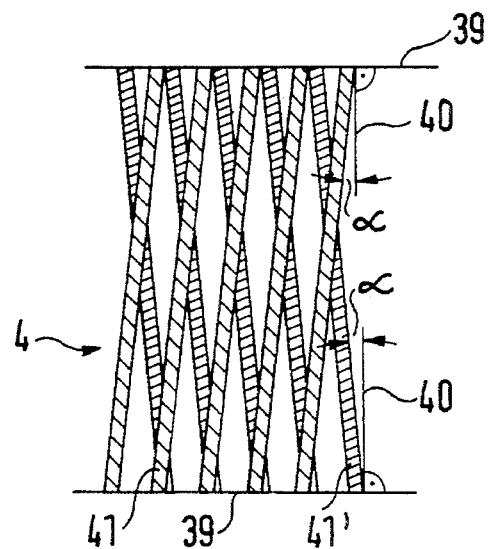
FIG. 14 is a schematic view of a corrugated strip with oblique corrugation and a corrugation of an adjacent layer strip superimposed thereon.

FIG. 14 shows a corrugated strip 4 with oblique corrugation, Here the corrugations 41 deviate from a line 40, which is perpendicular to edges 39 of the strip 4, by an angle α. By folding over the corrugated strip 4 at the apices of the loops 21 and 22, two layers of the corrugated strip 4 thus come to rest on one another, with the corrugation 41 of the top layer being oriented in the opposite direction from the corrugated strip layer beneath it. In that way, that the corrugations 41 of the top layer intersect the corrugations 41' of the corrugated strip layer beneath it at an acute angle (2α).

Figure 15:
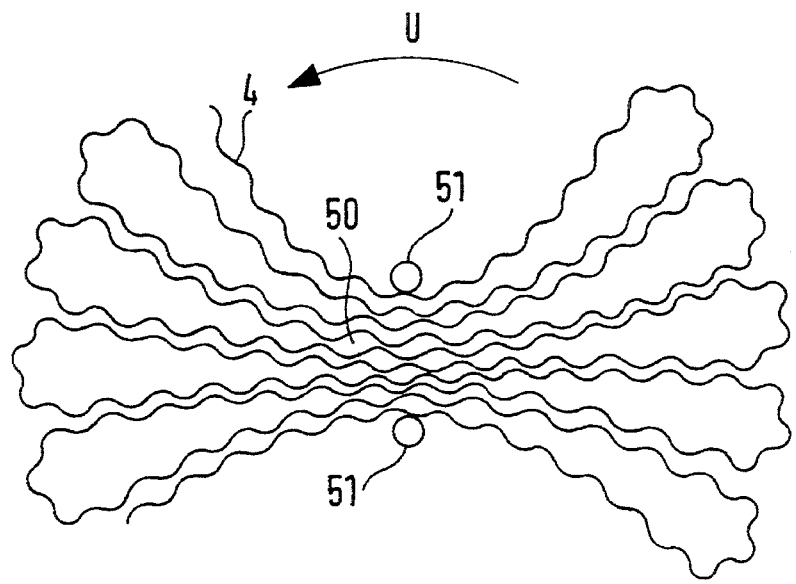
FIG. 15 is a cross-sectional view of a folded stack.

FIG. 15 shows an exemplary stack 50 with corrugated strip layers 4 folded in a zig-zag fashion on one another. The stack is retained between two fixed points 51. The ends of the stack 50 are wrapped in the wrapping direction around the fixed points 51, producing a honeycomb body whose layers are arranged approximately in an S.

Figure 16:
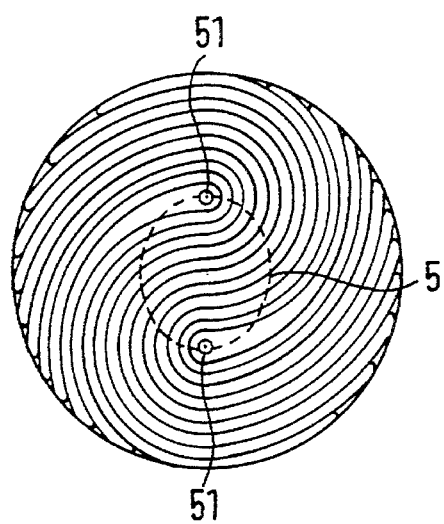
FIG. 16 is a similar view of the stack intertwined about two fixed points.

FIG. 16 shows one such honeycomb body, with the wrapping of FIG. 15 continued to a finished configuration.

Referring now to FIGS. 17 and 18, of which the former schematically shows an apparatus for producing a honeycomb body, one corrugated strip 4 and one smooth strip 3 are delivered to the apparatus. A stamping device 60 stamps striplike parts out of the strips 3 and 4 from the edges 39 inward. Only a narrow web 65 (FIG. 18) in the longitudinal axis of the strips 3 and 4 remains. In the further course of the apparatus, strip segments 61' (defined between two stamped-out, narrow webs 65) are rotated by 180° about the longitudinal axis relative to the strip segments 61, in the course of which the webs 65 are wound up in a spiral. In a subsequent folder apparatus, the strip segments 61 and 61', twisted counter to one another, are stacked up. The webs 65 are located at the apex points 66 of the loops. Accordingly, a stack is formed from alternating smooth and corrugated sheet metal layers.

Figure 19A:
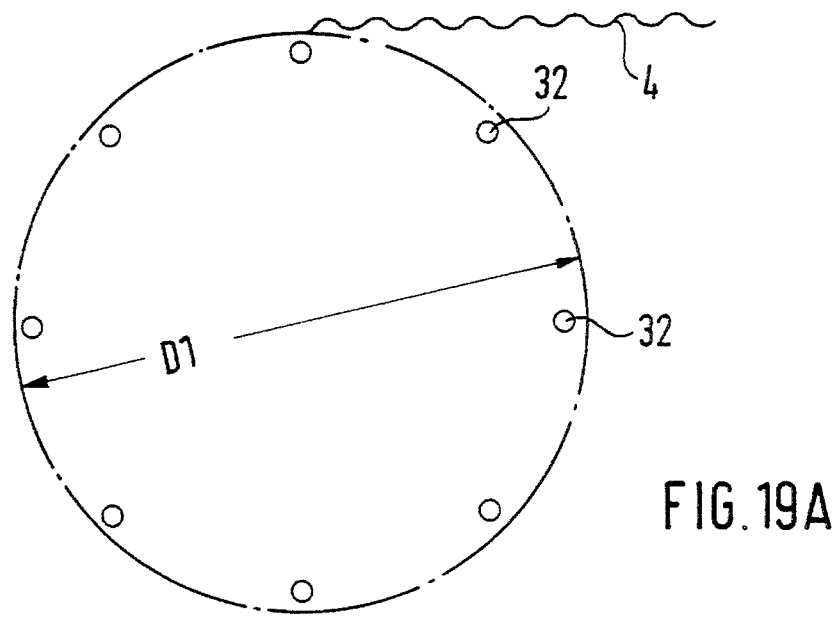
FIG. 19A is a diagrammatic side-elevational view of a corrugated strip wound into a circle.
Figure 19B:
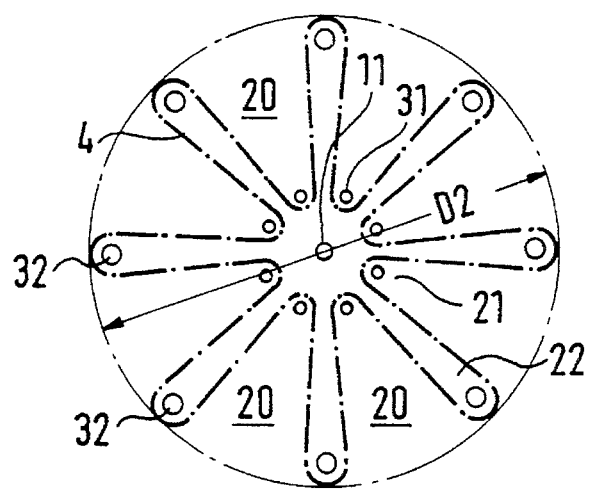
FIG. 19B is a similar view of the corrugated strip drawn into a rosette.
Figure 19C:
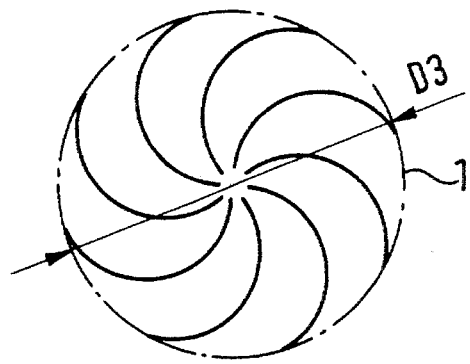
FIG. 19C is a similar view of the honeycomb body twisted into a spiral.

FIGS. 19a–19c illustrate the production of a further embodiment of the honeycomb body. The corrugated strip 4 is delivered to the winding apparatus, which includes the winding mandrels 32. The corrugated strip 4 is now wound up to make a hollow coil. The inside diameter D1 of the hollow coil is defined by the location of the winding mandrels 32. In the next production step, draw-in mandrels 31 are placed against the hollow coil and thrust between the winding mandrels 32 toward the center 11 of the honeycomb body. By the drawing in of circular sectors 20, the hollow coil is deformed into a rosette shape. The winding mandrels 32 are thrust towards the center 11, and as a result the outside diameter D2 of the rosette is smaller than the inside diameter D1 of the hollow coil. The winding mandrels 32 located in the radially outer loops 22 are then removed, while the draw-in mandrels 31 in the radially inner loops 21 remain and fix the inner loops 21 in the center 11 during the ensuing intertwining process. After the intertwining, the drawn-in mandrels 31 are also removed from the inner loops 21, so that finally a honeycomb body results formed from only the corrugated strip 4. The corrugated strip 4 is spirally arranged in the honeycomb body. The outside diameter D3 of the honeycomb body is smaller than the outside diameter of D2 of the rosette shape.

Figure 20:
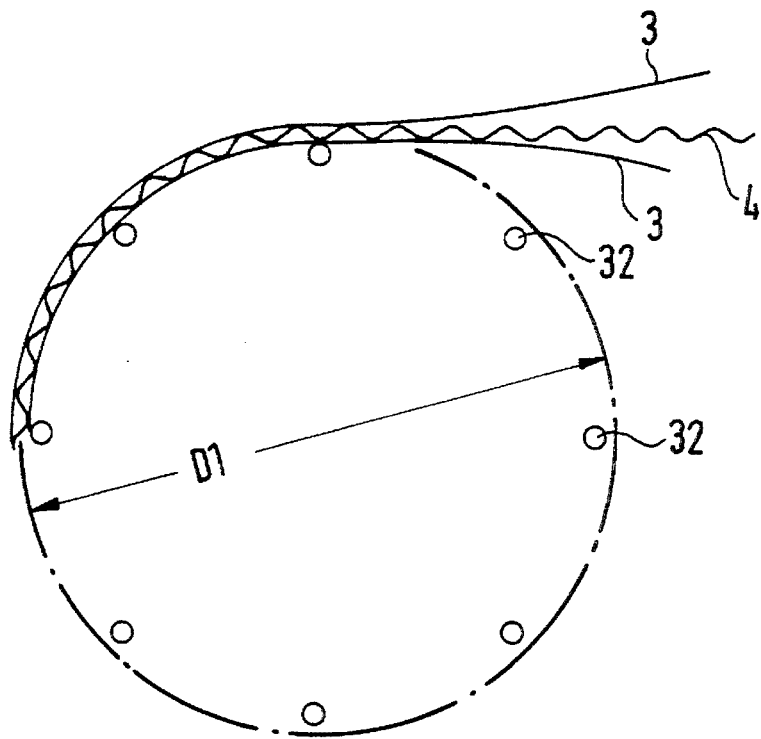
FIG. 20 is a diagrammatic view of smooth and corrugated strips wound up in a circle.

FIG. 20 shows the production of yet a further embodiment of the honeycomb body. The single corrugated strip 4 and two smooth strips 3 are simultaneously wound up to make one hollow coil. The corrugated strip 4 is located between two smooth strips 3, so that both the insides and the outside of the hollow coil are formed by the smooth strip. The production steps proceed analogously to those described in conjunction with FIGS. 19b and 19c.

Figure 21:
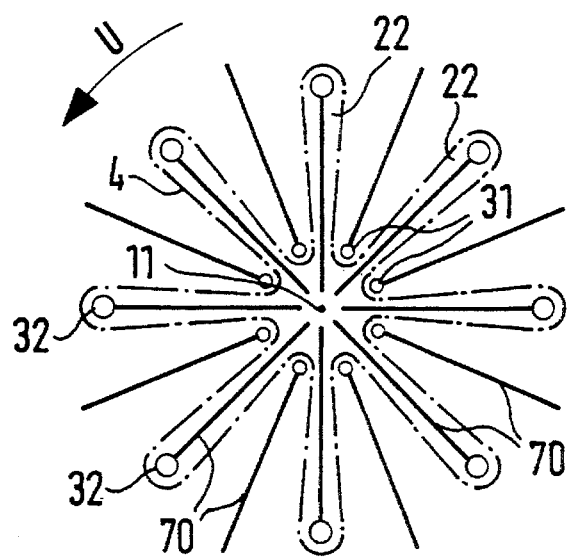

FIG. 21 shows a corrugated strip 4 that has been drawn in to make a rosette shape. Smooth sheet segments 70 are introduced into the interstices between the corrugated strips 4. The sheet segments 70 extend on the one hand toward the center 11 to the winding mandrels 32 and on the other extend outward from the draw-in mandrels 31. As a result, the individual layers of the corrugated strip 4 are each separated by one smooth sheet segment 70. After the winding mandrels 32 have been removed, the outer loops 22 are wrapped around the center 11 in the wrapping direction U. In this foregoing embodiment it is also possible to interchange the corrugated and smooth sheets, i.e. the strip 4 is smooth and the inserted strips 70 are corrugated.

The present invention is especially suitable for producing metal catalyst carrier bodies for motor vehicles in large-scale mass production; the honeycomb bodies thus produced, because of their symmetrical design and the approximately involutely-extending layers, are especially resistant to alternating thermal strains and severe mechanical strains.

We claim:

1. A metal honeycomb body, comprising a jacket member defining an interior with a substantially annular inner region and a substantially annular outer region, at least partly structured sheet-metal layers disposed in said interior, said sheet-metal layers being wrapped around one another and extending alternatingly back and forth in a curved fashion between said outer annular region and said inner annular region, and said sheet-metal layers forming loops, and at least three reversal lines defined in said outer annular region, said sheet-metal layers being intertwined about said at least three reversal lines.

2. The honeycomb body according to claim 1, wherein said jacket member defines a longitudinal axis in a center thereof, said reversal lines extend substantially parallel to said longitudinal axis, and said sheet-metal layers are curved in an approximately involute fashion.

3. The honeycomb body according to claim 1, including at least three reversal lines defined in said inner annular region.

4. The honeycomb body according to claim 3, wherein said at least three reversal lines in said inner and said outer annular regions are at least four reversal lines in said inner and outer annular regions.

5. The honeycomb body according to claim 3, wherein said reversal lines extend through two or more mutually concentric circles.

6. The honeycomb body according to claim 3, wherein the honeycomb body has a given cross-sectional shape, and said reversal lines are distributed within said jacket irregularly in accordance with the cross-sectional shape of the honeycomb body.

7. The honeycomb body according to claim 1, wherein an empty hollow central region is defined inside said inner annular region.

8. The honeycomb body according to claim 1, wherein said sheet-metal layers are formed by one to five sheet-metal strips having at least in part a corrugated structure.

9. The honeycomb body of one according to claim 1, wherein the honeycomb body has a given cross-sectional shape, and said reversal lines are distributed within said jacket irregularly in accordance with the cross-sectional shape of the honeycomb body.

10. The honeycomb body according to claim 1, wherein said jacket member is a jacket tube, an outermost sheet-metal layer being in contact with said jacket tube and defining lines of contact, said outermost sheet-metal layer being joined to said jacket tube by brazing, at least in subregions of said lines of contact.

11. The honeycomb body according to claim 1, wherein said sheet-metal layers define lines of mutual contact, said sheet-metal layers being brazed to one another at least in subregions of said lines of mutual contact.

12. The honeycomb body according to claim 1, including two end faces between which said sheet-metal layers extend, said sheet-metal layers being brazed to one another in a region of said two end faces.

13. The honeycomb body according to claim 1, wherein some of said loops are disposed within said inner annular region and said sheet-metal layers substantially fill-said inner annular region.

14. The honeycomb body according to claim 1, wherein at least some of said sheet-metal layers are formed of corrugated metal strips having a longitudinal edge, said corrugated strip having a corrugation with throughs and peaks extending in a direction which deviates from a perpendicular to said longitudinal edge of said metal strip by an angle of from 2° to 10°.

15. The honeycomb body according to claim 1, including smooth sheet-metal strips inserted between adjacent corrugated sheet-metal strips for avoiding double layers in the honeycomb body.

16. The honeycomb body according to claim 1, including corrugated sheet-metal strips inserted between adjacent smooth sheet-metal strips for avoiding double layers in the honeycomb body.

17. The honeycomb body according to claim 1, including a layer with an integrated electrical conductor, said electrical conductor being electrically insulated from adjacent sheet-metal layers, said electrical conductor being at least one of a hot conductor and a measurement sensor.

18. The honeycomb body according to claim 17, wherein said layer with said integrated electrical conductor is a corrugated sheet layer including two sheet-metal strips, said electrical conductor being disposed between said strips.

19. The honeycomb body according to claim 18, wherein said electrical conductor is rolled in between said strips.

20. The honeycomb body according to claim 1, wherein said sheet-metal layers are formed by a corrugated metal strip and two smooth metal strips, said corrugated metal strip being disposed between said two smooth metal strips.

21. The honeycomb body according to claim 1, wherein said sheet-metal layers are formed by a plurality of corrugated metal strips and smooth metal strips, said corrugated metal strips being disposed between said smooth metal strips.

22. The honeycomb body according to claim 1, wherein at least some of said layers are formed of corrugated sheet-metal strips, and including individual sheet-metal segments thrust in between said layers of said corrugated sheet-metal strips.

23. The honeycomb body according to claim 1, wherein said layers are formed of at least partly corrugated sheet metal strips and smooth sheet-metal strips each extending along a longitudinal axis, said layers being folded one on top another and defining apex points at said loops, said sheet-metal strips having lateral edges into which mutually opposed cut-outs are formed at said apex points such that a relatively narrower web is defined between said cut-outs and strip segments are defined between said apex points, adjacent ones of said strip segments being rotated relative to one another by 180° about the longitudinal axis.

* * * * *